UNITED STATES PATENT OFFICE.

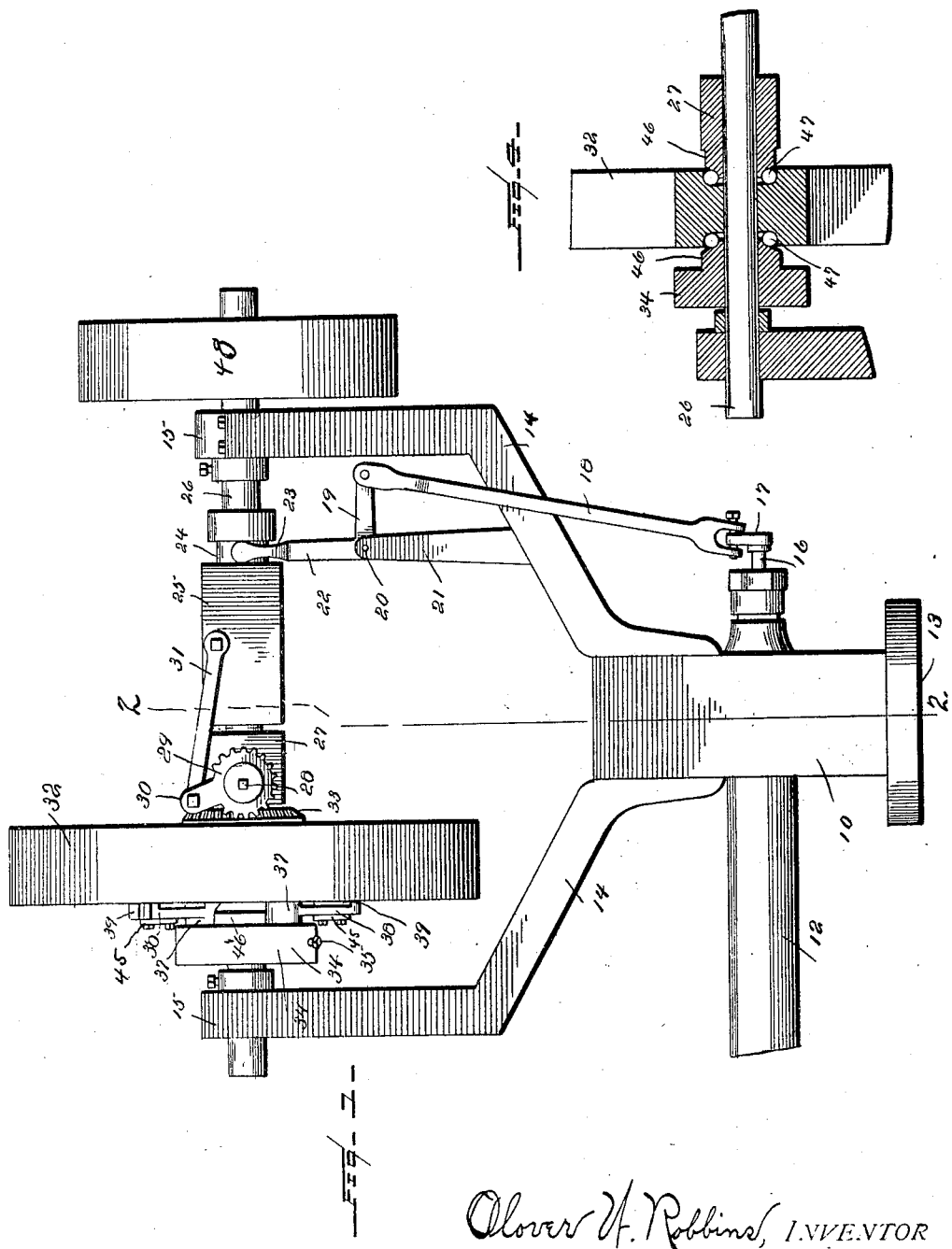

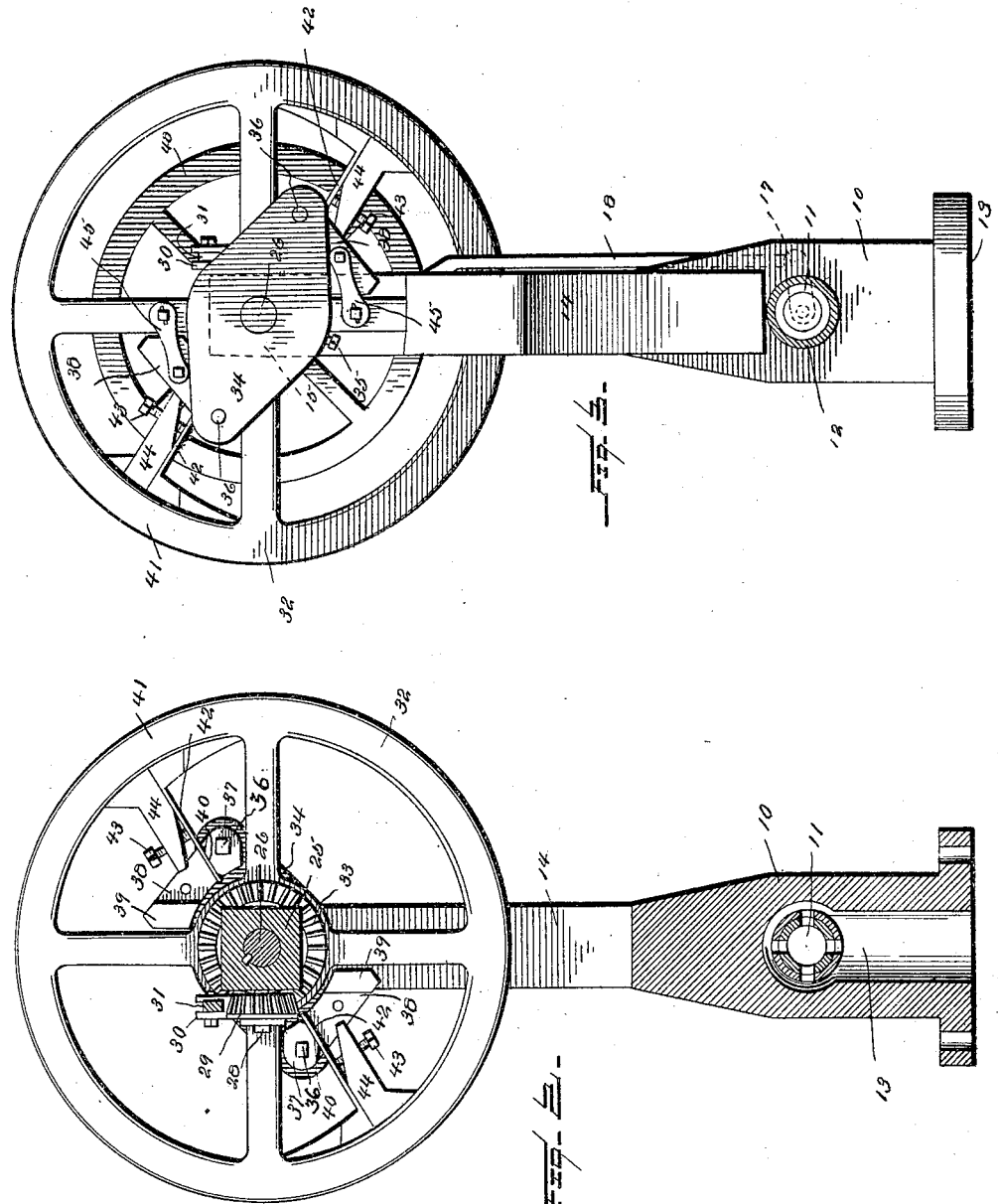

OLOVER W. ROBBINS, OF BURLESON, TEXAS.

SPEED-GOVERNOR.

No. 806,842.        Specification of Letters Patent.        Patented Dec. 12, 1905.

Application filed May 27, 1905. Serial No. 262,665.

*To all whom it may concern:*

Be it known that I, OLOVER W. ROBBINS, a citizen of the United States, residing at Burleson, in the county of Johnson and State of Texas, have invented new and useful Improvements in Speed-Governors, of which the following is a specification.

My invention is a speed-governor, and has for its object to provide a governor in which friction is reduced to a minimum and which is sensitive and reliable in operation.

To this end the invention consists in certain novel features of construction hereinafter described and claimed.

In the accompanying drawings, Figure 1 is an elevation of the governor. Fig. 2 is a vertical section on the line 2 2 of Fig. 1. Fig. 3 is an end elevation. Fig. 4 is a sectional detail.

Referring specifically to the drawings, 10 denotes a casing which contains a rotary valve 11, controlling the supply of steam or other motive fluid to the engine. The inlet-pipe is indicated at 12 and the outlet-pipe at 13. A pair of arms 14 extend from the valve-casing and are provided with bearings 15. The arms can be cast integral with the valve-casing, or they may be bolted thereto. The valve-stem 16 is fitted with a crank 17, which is joined by a connecting-rod 18 to one arm 19 of a bell-crank lever, which is fulcrumed, as at 20, on a support 21, rising from one of the arms 14. The other arm 22 of the bell-crank lever is forked transversely, as at 23, and its branches extend into a groove 24 in a sleeve 25, which is slidably mounted on a shaft 26, journaled in the bearings 15. The sleeve is prevented from rotating on the shaft by a feather or other suitable means. Longitudinal movement of the sleeve on the shaft operates the valve through the connections just described.

Adjacent the sleeve 25 is a sleeve 27, which is fastened on the shaft 26 and carries a pin 28, on which a small toothed wheel 29 is mounted. This wheel has a projecting forked arm 30, which is joined by a connecting-rod 31 to the sleeve 25, whereby the latter sleeve is caused to slide lengthwise on the shaft 26 when the wheel 29 is rotated.

At 32 is indicated a wheel which is loose on the shaft 26. Teeth 33 are cut in the hub 34 of this wheel on one side thereof, which teeth mesh with those on the wheel 29. Adjacent the wheel 32 is a cross-bar 34, which is made fast to the shaft 26 by a set-screw 35 or other suitable means. The outer ends of the cross-bar carry projecting pins 36, on which the governor-weights are pivotally mounted. The governor-weights comprise sleeves 37, which are pivotally mounted on the pins 36 and have projecting arms 38, provided with weighted extremities 39. One side of the sleeves is flattened, as at 40. The governor-weights are located between the spokes of the wheel 32, and to the rim 41 of the latter flat springs 42 are secured, which bear on the flattened sides of the sleeves 37. The tension of the springs is regulated by set-screws 43, which are threaded through brackets 44, secured to the rim 41. As stated, the peripheries of the sleeves 37 are flattened or made cam-shaped, as at 40, so that the pressure of the springs 42 thereagainst tends to resist the turn of the sleeve, and consequently the outward movement of the governor-weights. The arms 38 are connected by slotted links 45 to the wheel 32, preferably the spokes thereof, for a purpose to be hereinafter stated.

The operation of the governor is as follows: The wheel 32, although loose on the shaft 26, rotates therewith by reason of the links 45 connecting it to the governor-weights, which in turn are carried by the cross-bar 34, the latter being made fast to the shaft. When in consequence of the speed of the engine the governor-weights fly outwardly beyond a predetermined point by reason of the centrifugal force, they pull the wheel 32 around on its axis—that is, they vary the relative angularity of the cross-bar 34 and the wheel 32 and cause the wheel to "creep" or move around on the shaft. This creeping or movement of the wheel through the gears 33 and 29 turns the latter gear and by movement of the connecting-rod 31 causes the sleeve 25 to slide lengthwise on the shaft 26, which by reason of the connections heretofore described operates the valve 11 to decrease the steam-supply. When the speed of the engine is lowered, the governor-weights return toward their normal position, being assisted in this by the pressure of the springs 42 on the cam-surfaces of the sleeve 37, whereby the wheel 32 is pulled back and the valve is operated to increase the steam-supply through the gearing and connections just described.

The wheel 32 will preferably be made ball-bearing, so as to be sensitive in responding to the pull of the governor-weights. The cones 46 for the balls 47 are on the sleeve 27 and the cross-bar 34.

The speed at which the governing mechanism acts can be controlled by adjustment of the sleeve 25 lengthwise on the shaft 26. This is readily done by loosening the set-screw 35 and turning the cross-bar 34 and wheel 32 on the shaft 26.

A belt-wheel 48 imparts motion to the shaft 26.

Having thus described my invention, what is claimed as new, and desired to be secured by Letters Patent, is—

1. A speed-governor comprising a shaft; a member made fast to the shaft, and carrying governor-weights; a member loosely mounted on the shaft, and connected to the governor-weights and rotatable thereby; and a gearing and connection between said loose member and the governor-valve.

2. A speed-governor comprising a shaft; a member made fast to the shaft, and carrying governor-weights; a member loosely mounted on the shaft, and connected to the governor-weights and rotatable thereby; a sleeve slidable lengthwise on the shaft, and having a connection with the governor-valve; and a gearing and connection between the loose member and the sleeve.

3. A speed-governor comprising a shaft; a member made fast to the shaft, and carrying governor-weights; a member loosely mounted on the shaft, and connected to the governor-weights, and having a gear; a sleeve slidable lengthwise on the shaft, and having a connection with the governor-valve; a sleeve fast on the shaft; a gear-wheel carried by the latter sleeve, and meshing with the gear on the loose member; and a connection between said gear-wheel and the slidable sleeve.

4. A speed-governor comprising a shaft; a member made fast to the shaft and carrying projecting pins; cam-sleeves mounted on the pins; weighted arms extending outwardly from the sleeves; a member loosely mounted on the shaft, and connected to the weighted arms; a gearing and connections between said loose member and the governor-valve; and springs secured to the loose member, and bearing on the cams of the aforesaid sleeves.

5. A speed-governor comprising a rotatable shaft; a fast and a loose member on the shaft; centrifugally-operated means to vary the relative angularity of said members by turning the loose member on the shaft with respect to the fast one; and gearing and connection between the loose member and the governor-valve.

6. A speed-governor comprising a fast and a loose member on the shaft; centrifugally-operated means to vary the relative angularity of said member by turning the loose member on the shaft, with respect to the fast member; a gear on the loose member; a sleeve slidable lengthwise on the shaft, and having a connection with the governor-valve; a sleeve fast on the shaft; a gear-wheel carried by the latter sleeve, and meshing with the gear on the loose member; and connection between said gear-wheel and the slidable sleeve.

In testimony whereof I have signed my name to this specification in the presence of two subscribing witnesses.

OLOVER W. ROBBINS.

Witnesses:
W. J. ROBINSON,
R. O. NEUSOM.